Oct. 21, 1958     C. R. MATTHEWS     2,856,733
HEALING FLUID APPLICATOR FOR GROWING PLANTS
Filed March 13, 1953
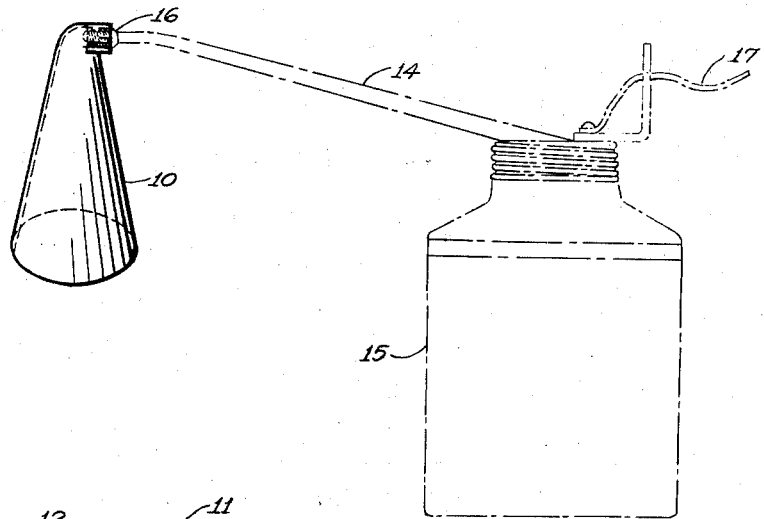
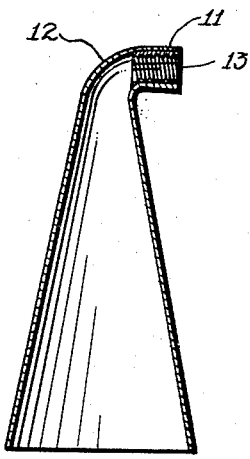
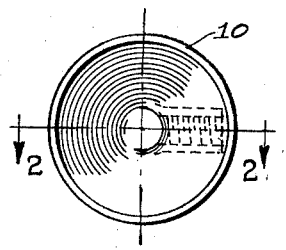
Fig.1
Fig.2
Fig.3
INVENTOR.
Cyrus R. Matthews,
BY Victor J. Evans & Co.
ATTORNEYS

United States Patent Office 2,856,733
Patented Oct. 21, 1958

2,856,733

HEALING FLUID APPLICATOR FOR GROWING PLANTS

Cyrus R. Matthews, Godwin, N. C.

Application March 13, 1953, Serial No. 342,045

1 Claim. (Cl. 47—1)

This invention relates to devices for healing cuts or wounds in plants, and in particular a cone carried by the end of a spout of a container whereby with the cone positioned over the upper end of a stalk of tobacco, or the like from which the top or upper end has been removed a healing fluid may readily be applied to the end of the stalk without danger of the fluid being sprayed upon surrounding leaves of the plant.

The purpose of this invention is to provide a protecting shield for a liquid applicator whereby a tobacco grower or attendant may walk down a row of tobacco plants and readily apply a few drops of a healing liquid to the upper ends of the plants from which tops have been removed wherein the liquid is confined to the end of the stalk of the plant.

Various types of spraying devices have been provided for applying insecticide and other toxic fluids to plant life, however, with devices of this type it is desirable to spray the fluid over as great an area as possible, whereas, in applying a healing liquid to a tobacco plant it is essential that the liquid be confined to the stalk. With this thought in mind this invention contemplates a comparatively small cone having an internally threaded nipple extended from one side of the small end whereby with the nipple threaded on the end of a container spout liquid applied by the device is confined to the area within the cone.

The object of this invention is, therefore, to provide an applicator in which liquid applied thereby is retained in a comparatively small area.

Another object of the invention is to provide an applicator for use in applying healing liquids to tobacco plants in which the device is adapted to be applied to spouts of containers now in use.

A further object of the invention is to provide an applicator for use in applying healing compounds to tobacco stalks from which tops have been removed in which the device is of a simple and economical construction.

With these and other objects and advantages in view the invention embodies a conical-shaped casing, the small end of which is extended to one side providing a nipple, the axis of which is perpendicular to the axis of the cone and the interior of which is provided with an internally threaded bushing.

Other features and advantages of the invention will appear from the following description taken in connection with the drawing, wherein:

Figure 1 is a side elevational view of the applicator showing the applicator positioned on the end of a spout of a container, the container and spout being shown in broken lines.

Figure 2 is a vertical section through the applicator taken on line 2—2 of Fig. 3.

Figure 3 is a view looking upwardly toward the lower end of the applicator.

Referring now to the drawing wherein like reference characters denote corresponding parts the improved applicator of this invention includes a body member or cone 10 having a nipple 11 connected by a 90 degree turn or elbow 12 through the small end of the cone and provided with an internally threaded bushing 13 which may be secured in the nipple by welding or other suitable means.

With the parts formed in this manner the applicator is installed on the end of a spout 14 of a container 15 with the bushing 13 threaded on a section 16 of the spout.

In use the container 15 may be provided with a healing fluid and with the container held in one hand an operator places the cone 10 over the upper end of a stalk from which the top has been removed and by pressing a lever, such as the lever 17 downwardly, a few drops of liquid may be fed through the spout 14 to the small end of the cone.

By this means liquid is confined to the area at the upper end of the stalk and with the cone positioned over the stalk the possibility of leaves of the plant being damaged by spray from the liquid or by wind blowing the liquid from the cone to the leaves is substantially eliminated.

It will be understood that modifications, within the scope of the appended claim, may be made in the design and arrangement of the parts without departing from the spirit of the invention.

What is claimed is:

In a device for applying healing fluid to growing plants that are to be treated, in combination with a small container adapted to be held in the hand and said container having a quantity of the plant healing fluid therein, said container including a manually operable lever and a discharge spout having a threaded outer end, of a body member including a major portion of conical formation, said body member being made of thin material and having an outlet end of enlarged circular smooth formation, the other end of the body member being smaller in size and having a right angularly arranged nipple extending therefrom, said nipple being of cylindrical formation and being of uniform diameter throughout, the axis of the nipple being perpendicular to the axis of the body member, a cylindrical bushing secured within said nipple, said bushing being threaded internally and threadedly engaging the threaded end portion of the spout.

References Cited in the file of this patent

UNITED STATES PATENTS

| 419,942 | Harding | Jan. 21, 1890 |
| 579,815 | Blanchard | Mar. 30, 1897 |
| 1,836,449 | Colvin | Dec. 15, 1931 |
| 2,538,934 | Duberstein | Jan. 23, 1951 |
| 2,562,930 | Mapes | Aug. 7, 1951 |
| 2,573,982 | Ofeldt | Nov. 6, 1951 |
| 2,586,809 | Freygang | Feb. 26, 1952 |
| 2,599,533 | Allen | June 10, 1952 |
| 2,730,838 | Wilson | Jan. 17, 1956 |

FOREIGN PATENTS

| 437,472 | France | Feb. 17, 1912 |
| 194,175 | Great Britain | Mar. 13, 1923 |
| 19,165 | Netherlands | Dec. 15, 1928 |

OTHER REFERENCES

"The Clip-Oil . . ." published October 1950 as Information Series No. 3, Department of Agricultural Engineering, N. C. Agricultural Experiment Station, Raleigh, N. C., pages 6 and 7.